INVENTOR
JOHN F. BEDINGER

United States Patent Office 3,537,306
Patented Nov. 3, 1970

3,537,306
DAYTIME WINDS DETECTOR
John F. Bedinger, Framingham, Mass., assignor to GCA Corporation, Bedford, Mass., a corporation of Massachusetts
Filed Dec. 12, 1968, Ser. No. 783,299
Int. Cl. G01w 1/00
U.S. Cl. 73—170                           13 Claims

ABSTRACT OF THE DISCLOSURE

A photometer for daytime measurement of winds in the earth's upper atmosphere by detecting and tracking the motion of a radiant vapor trail in the presence of the natural radiation from the daytime sky by means of a narrow band filter technique which determines the presence of the vapor trail radiation as the unbalance of a sensitive null system. A beam of light from the sky is directed toward a narrowband interference filter alternately at normal incidence and at an angle that is deviated from the normal so that light at the wavelength of the vapor trail may pass through the filter at normal incidence but not at the deviated angle. Optical filters are employed to balance the light flux of the normal and deviated beams when the vapor trail is not within the field angle of the photometer so that the output signal of a photocell oriented to receive the filtered beams will remain constant and in balance. The presence of the vapor trail within the field angle of the photometer causes an increased light flux to pass through the filter at normal incidence which creates an unbalance in the output signal of the photocell, thus providing an indication of the presence of the vapor trail.

SUMMARY OF THE INVENTION

The measurement of the direction and magnitude of winds in the earth's upper atmosphere has become increasingly important in view of the technological advances being made in the areas of high altitude flight, space probes, etc. Although a number of techniques have been proposed and utilized to detect and measure the winds in the earth's upper atmosphere, none of these techniques have provided entirely satisfactory results when employed under varying atmospheric conditions. In addition, currently available techniques and devices have proved to be somewhat cumbersome and relatively expensive. For example, at present, the only available method for observing daytime winds at altitudes above 80 kilometers is the radio-meteor method in which ionized meteor trails are detected and tracked. This method, however, is useful only between altitudes of approximately 80 and 105 kilometers, which is the region of most numerous ionized meteor trails. In addition, the radio-meteor method requires that a relatively large volume of space be scanned and the readings thus obtained be averaged. As a result, this method does not lend itself readily to detection of minor variations in the wind profile and is suitable primarily for detecting the motion of relatively large masses of air. Furthermore, because the meteor trails are naturally occurring phenomena they are not subject to control as are the rocket-ejected vapor trails which are tracked in accordance with my invention. Among the objects of my invention is to provide a photometer for observing and tracking daytime winds over a wide altitude range.

The use of photometers and photometric techniques for measuring various parameters within the earth's atmosphere is not of itself new and numerous photometric devices for observing atmospheric phenomena have been proposed in the prior art. For example, photometers have been constructed to observe atmospheric phenomena such as resonant scattering from nuclear debris or airglow. These applications, however, have required a relatively large field angle in order to improve the signal to noise ratio. In order to obtain accurate results when triangulating on a relatively narrow vapor trail, a very small field angle is required and, because of this, the instrumentation and technique of my invention is necessarily quite different.

The technique of tracking vapor trails in the earth's upper atmosphere has been found to be the only effective method for observing winds at an altitude above 110 kilometers. Because the emission from fluorescent or chemiluminescent vapor trails is rather faint in comparison to the scattered sunlight in the daytime sky, daytime detection and observation of these trails has not been possible. Accordingly, the technique of tracking vapor trails has been limited to use during twilight and nighttime conditions where the background light flux of the sky is of relatively low intensity as compared to the light flux emitted by the vapor trail.

One of the objects of my invention is to provide a photometric technique which utilizes a highly sensitive photometer adapted to detect relatively small variations between the vapor trail emission and the scattered radiation from the bright daytime sky so that the photometer may detect the presence and track the movement of a vapor trail under daytime conditions. Additionally, the photometer employs a narrow field angle and thus is suited for triangulation on the vapor trail.

In brief, the photometer, in accordance with my invention, employs a rotating mirror to pass a narrow beam of light from the sky through a narrow band interference filter, first at normal incidence to the filter and then alternately at a small, deviated angle to the normal. The passband of the filter is controlled so that when the beam is at normal incidence to the filter a narrow spectral band which includes the wavelength of the light emitted by the vapor trail will pass through the filter but when the beam of light impinges on the interference filter at the deviated angle, the passband of the interference filter shifts to a lower range of wavelengths which does not include that emitted by the vapor trail.

In describing my invention the unshifted passband which includes the radiation emitted by the vapor trail will be referred to as the primary passband and the shifted passband which does not include the vapor trail radiation will be referred to as the secondary passband.

The continuous spectrum of the daylight sky includes light at a wavelength identical to that emitted by the vapor trail. Thus, when there is no vapor trail present in the field angle subtended by the photometer, the naturally occurring light flux at this wavelength will pass through the interference filter when the beam is at normal incidence. When the incidence of the beam is alternated so that it impinges on the interference filter at the deviated angle the shifting of the passband to the lower spectral band precludes the transmission of the naturally occurring narrow spectral region which includes the light emitted by the vapor trail.

Although the beams of light that pass through the filter at normal incidence and at the deviated angle are of slightly different wavelengths, the wavelengths are in closely adjacent spectral regions so that the difference in the energy levels of the beam is minimal. Thus, when the vapor trail is not present within the field angle of the photometer and the angle of incidence is alternated between the normal and deviated angle, there will be a slight difference in the light flux passing through the filter. This difference in the energy levels of the alternating beams may be balanced by interposing suitable optical filters along the normal path of light so that when the vapor trail is not within the field angle of the photometer the light flux passed through the filter at normal incidence and at an angle to the normal will be in balance.

When the vapor trail is present within the field angle of the photometer, the emitted radiation will pass normally through the filter but will be precluded from passing through the filter when the beam is deviated. The light emitted by the vapor trail adds slightly to the intensity of the light being passed through the filter at normal incidence so that the total radiation in that beam is greater than that passed through the filter at the deviated angle. This unbalance in energy levels is due to the presence of the vapor trail within the field angle of the photometer, and is detected by a photocell located on the exit side of the interference filter. The unbalanced light flux produces an unbalance in the output signal of the photocell and the signal is amplified and synchronously rectified by appropriate electronic circuitry.

From the foregoing it will be appreciated that my photometer employs a highly sensitive null detection method in which the radiation emitted by the vapor trail is tracked against the background radiation emitted by the bright daytime sky.

Other objects and advantages of my invention will be apparent from the following detailed description with reference to the accompanying drawings wherein.

Figures 1, 2:
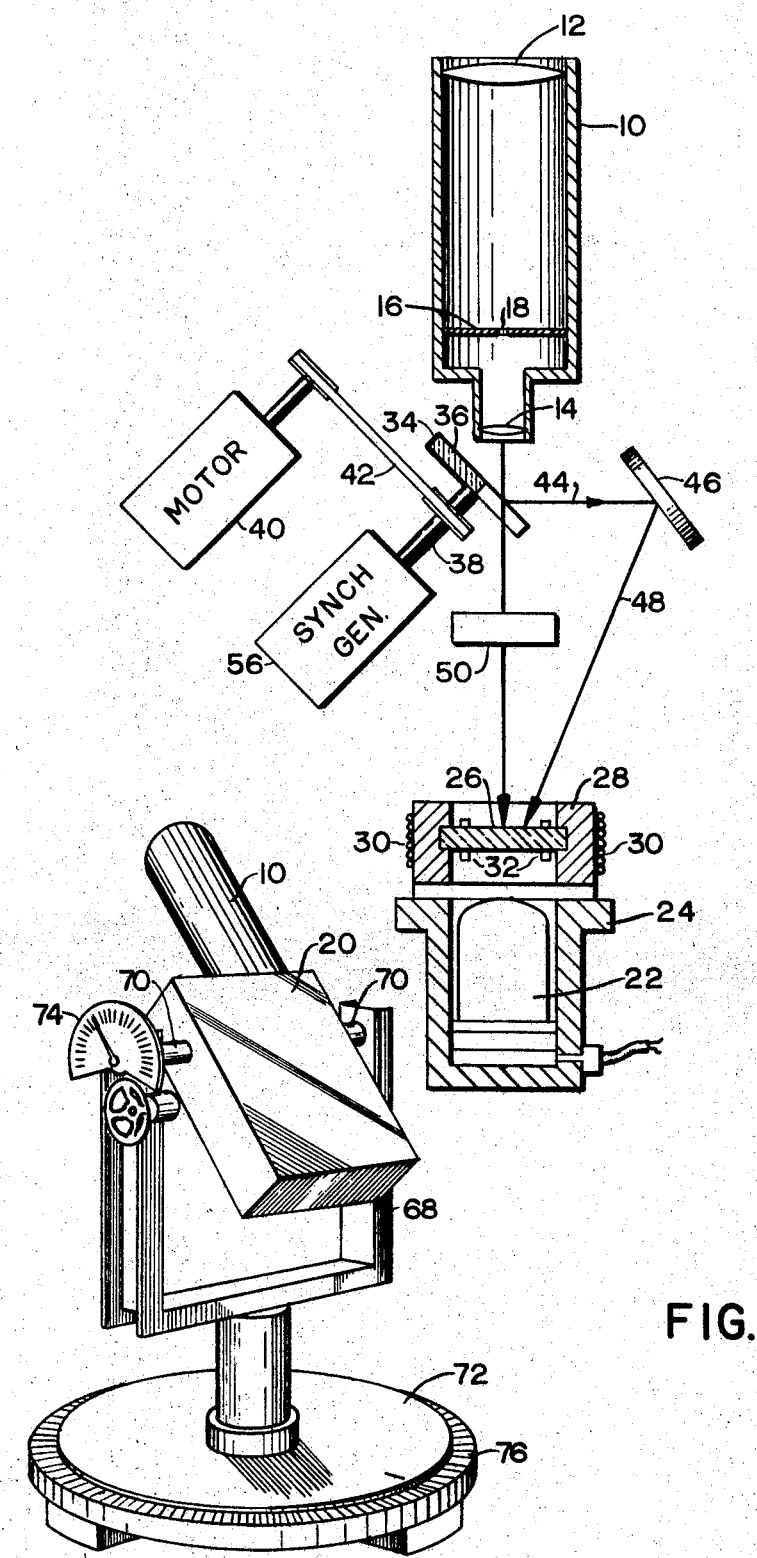
FIG. 1 is a somewhat schematic illustration of the optical system employed in my photometer.
FIG. 2 is an illustration of the photometer mounted for scanning the sky.

The photometer as shown in FIG. 1 includes an optical barrel 10 having an objective lens 12 mounted at one end and a collimating lens 14 at the other end. A plate 16 is supported in the barrel 10 and is provided with a narrow field stop opening 18 in optical alignment with the objective and collimating lenses 12 and 14. A field stop of approximately ½ degree has been found suitable. The barrel 10 is mounted to a housing 20 which is enclosed to exclude stray light. The interior of the barrel, housing and internal elements of the photometer are coated with black, non-reflective paint.

A photomultiplier tube 22 is supported within the housing 20 by a tube mount 24 which in turn is secured to the housing 20. The tube is disposed in alignment with the optical axis of the lenses 12 and 14 and the field stop 18 so that a beam of light exiting from the collimating lens 14 may impinge directly on and activate the phototube 22.

A narrow band interference filter 26 is interposed between the collimating lens 14 and the photomultiplier tube 22, the filter 26 being rigidly positioned so that the beam of light exiting from the collimating lens 14 will impinge normally on the filter 26. The filter 26 should have a relatively narrow passband halfwidth of 2 A. or less. The selected filter 26 should include the wavelength of the light emitted by the vapor trail within the half width range of its passband when the light is at normal incidence to the filter 26. For example, when a lithium vapor trail is to be tracked, the half width passband range would include wavelengths between 6707 A. and 6709 A. so that the light emitted by the lithium trail, which is at 6708 A. will pass through the filter at normal incidence.

Due to the fact that interference filters of this type are highly sensitive to temperature, in that a change of temperature results in a shifting of the passband, the filter temperature is monitored and controlled so that the passband will include the light emitted by the vapor trail. To this end the filter 26 is mounted to a heat conductive filter support 28 which in turn is heated by electrical resistance wires 30 wrapped about the filter support 28. The temperature of the interference filter 26 is monitored continuously, such as by thermistors 32 which, by appropriate circuitry, control the current in the resistance wires 30 to maintain the filter at the desired, constant temperature and thus preclude the passband from shifting from its desired range.

The photometer includes an arrangement for causing the light beam to impinge on the filter 26 alternately between an angle of normal incidence and an angle that is deviated slightly from the normal. One of the characteristics of interference filters 26 of the type described is that when the light beam approaches the filter 26 at an angle that is deviated from the normal, the passband of the filter shifts to a lower range of wavelengths. For example, when the filter described above is at the proper temperature and the light beam impinges at normal incidence, the passband half-width range will pass radiation between 6707 and 6709 A., thus permitting the radiation from the lithium vapor trail to pass through the filter. When the light beam is directed toward the interference filter 26 at the deviated angle, the passband for the deviated beam shifts to a lower spectral band which does not include the radiation at the wavelength emitted by the vapor trail. For example, if the beam is deviated 5 degrees from normal incidence, the passband of the filter may shift to a lower position in which the passband half-width includes the spectral band between 6700 and 6702 A., thus precluding the lithium radiation at 6708 A. from passing through the filter at the deviated angle. Thus, when alternating the beam between normal and deviated incidence the filter will alternately permit or preclude the radiation from the vapor trail from passing through the filter. For this purpose a rotary chopper 34 having a mirrored segment 36 is disposed along and intersects the optical axis. The chopper 34 is secured to a shaft 38 which is rotatably supported and which is oriented so that the chopper 34 and its mirrored segment 36 will rotate in a plane at an angle to the optical axis. Any suitable drive means such as a motor 40 and drive belt 42 may be employed to drive the chopper 34. As the chopper 34 is rotated the light beam exiting from the collimating lens 14 will alternately pass through the unmirrored portion of the chopper 34 and impinge at normal incidence on the interference filter and then be reflected by the mirrored segment 36 of the chopper 34 along the path 44 indicated in FIG. 1. A stationary mirror 46 is mounted within the housing in a position to reflect the chopped light beam toward the interference filter 26 at the desired deviated angle as indicated by the path 48. The mirror 46 is positioned to reflect the chopped light beam at an angle which is deviated to the degree required to shift the pass band of the filter to the range that excludes the radiation of the vapor trail.

When there is no lithium present within the field angle of the photometer a narrow spectral band of the radiation that occurs naturally in the daytime sky will pass through the filter alternately at normal incidence and at an angle to the normal. The narrow spectral band which is passed through the interference filter at normal incidence will include naturally occurring light having the same wavelength as the vapor trail while the narrow spectral band passed through the filter at an angle to the normal will be of a lowered spectral which does not include that particular wavelength. When the vapor trail is not within the field angle subtended by the photometer the energy level of the light passing normally through the filter will be slightly greater than the energy level of the light passing at an angle to the normal but, because the primary and shifted passbands are in closely adjacent spectral regions, this difference in energy level will be minute. Additionally, energy loss may be incurred along the deflected path 48 as a result of the multiple reflection to which the chopped beam is subjected as well as any distortion of the collimated beam. In order to employ a null detection method, it is necessary, however, to balance the energy levels of the normal and deviated beams so that the output signal of the phototube will not vary when the vapor trail is not present. This may be accomplished by a neutral density filter 50 interposed along the normal path between the rotary chopper 34 and the interference filter 26. The neutral density filter 50 is effective to reduce the energy level of the normal beam to the level of the deviated beam so that when the radiation which occurs naturally in a daytime sky passes alternately through the filter at normal incidence and at an angle to the normal, both beams will be of identical energy levels and the output of the phototube will be constant, thus providing a fixed reference signal with which radiation emitted by the vapor trail may be compared.

The presence of a vapor trail within the field angle subtended by the photometer will have no effect on the energy level of the deviated beam because the spectral band of the deviated beam which is passed through the filter will not include radiation at the same wavelength as that of the vapor trail. The energy level of the deviated beam thus will be the same whether or not the vapor trail is present. When the beam impinges normally on the interference filter, however, the passband of the filter will permit the vapor trail radiation to reach the phototube. It will be appreciated that the light flux passing normally through the filter will be greater when the lithium is present, causing an increase in the output signal of the phototube. Thus when the trail is not present, the output from the phototube will not vary as the angle of incidence of the beam is varied from the normal to the deviated but when the trail is present the phototube output will vary alternately in response to the difference in energy levels of the light flux of the normal and the deviated beams.

Figure 3:
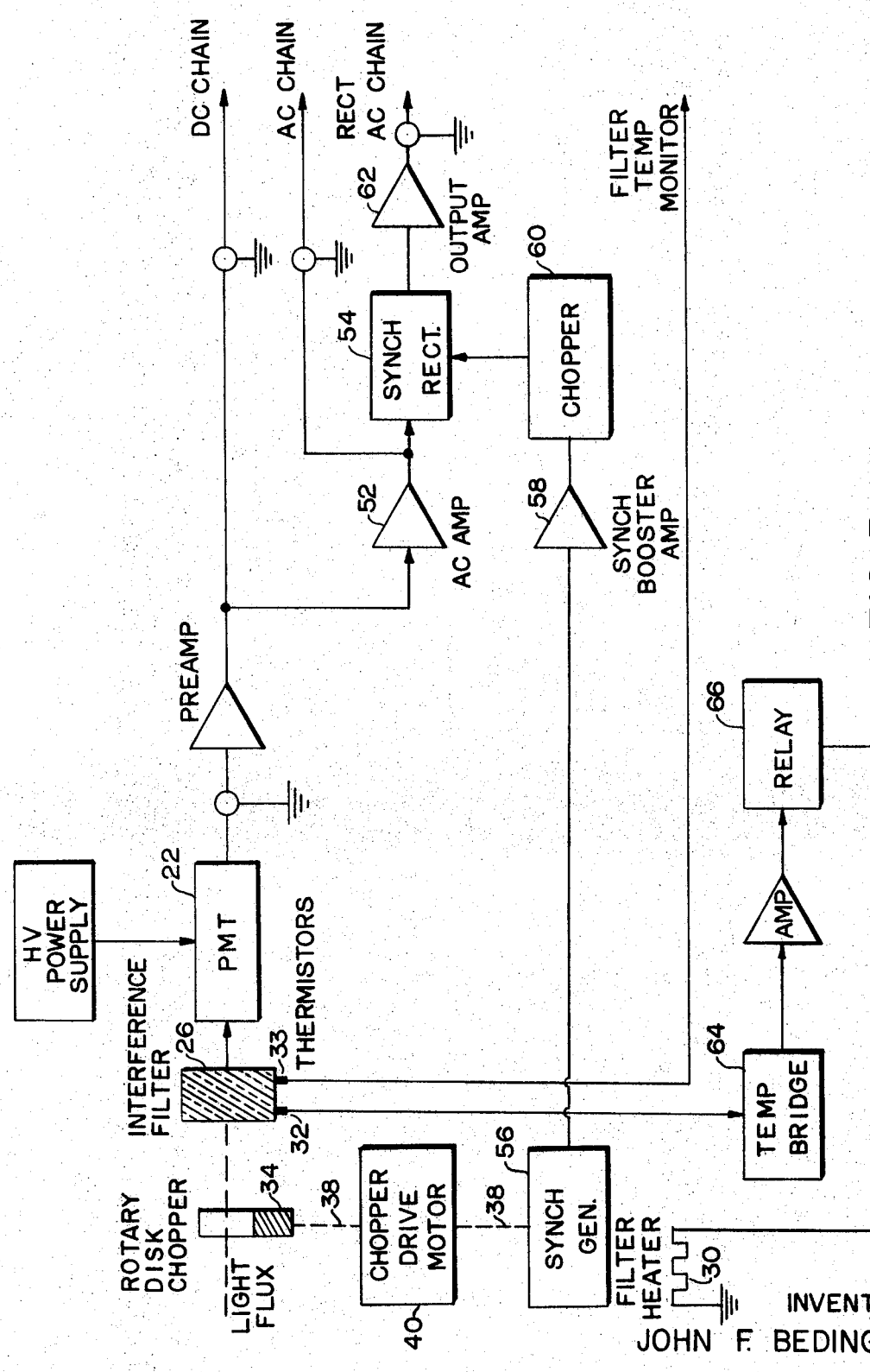
FIG. 3 is a schematic illustration of the electronic circuitry associated with the photometer.

The circuitry for detecting and measuring the variations in the output signal of the phototube is illustrated in FIG. 3 from which it will be seen that the AC output signal of the phototube 22 in response to the presence of the lithium vapor trail, is amplified by an AC amplifier 52 and is then synchronously rectified by the rectifier 54. The rectifier 54, is operated in phase with the rotary chopper 34 and is controlled by a synchronous generator 56 which in turn is driven by the shaft 38. The output of the synchronous generator 56 is amplified, as by an AC booster amp 58, and this amplified output is fed into a chopper 60 which in turn controls the operation of the synchronous rectifier 54. The rectified signal from the synchronous rectifier 54 may be amplified by a DC output amplifier 62.

FIG. 3 also shows the arrangement for monitoring continuously and controlling the temperature of the interference filter 26. Thermistors 32 are bonded to the interference filter 26 and are connected to a temperature bridge 64. The output of the bridge controls the operation of a relay 66 which in turn controls the current supplied to the electrical resistance wires 30. Another thermistor 33 may be attached to the interference filter 26 and may be connected directly to a suitable indicator 67 calibrated to permit direct and continuous observation of the filter temperature.

As shown in FIG. 2, the photometer housing is pivotally mounted to a yoke 68 by means of trunnions 70 to permit scanning at various elevation angles. The yoke 68 is in turn mounted on a horizontal turntable 72 to permit variation in the azimuth of the photometer. Directional indicators 74 and 76 are provided to facilitate calibration of the elevation angle and azimuth of the photometer.

When tracking a vapor trail it will be appreciated that in order to triangulate properly on a selected segment of the trail at least two ground based photometers will be required. Due to the fact that the vapor trail profiles generally are quite irregular in contour the use of only two photometers may not provide readings with the degree of accuracy required. Thus it may be preferable to use three or four photometers if it is desired to obtain readings with a high degree of accuracy.

Although the photometer has been described as being used to detect and track a lithium vapor trail, it will be appreciated that it may be used to detect the presence of other vapor trails which emit radiation at different wavelengths, provided that the passband of the selected interference filter is shifted between the primary spectral band that includes the radiation of the vapor trail and a secondary spectral band that does not include the radiation of the vapor trail.

In accordance with my invention a highly sensitive photometer may be constructed which is capable of detecting a change in 1% of the brightness of light radiated from the atmosphere. It has been found that the brightness of the sky in a two A. bandwidth is approximately ten times the initial brightness of a solar illuminated lithium vapor trail and, due to diffusion of the vapor trail, becomes no more than 100 times the trail brightness after a period of approximately ten minutes. A photometer constructed in accordance with my invention, is sensitive to detect a change in brightness of approximately 1%, thus is capable of sensing the presence of the lithium vapor trail for approximately ten minutes. It has been found that ten minutes is an adequate period of time to obtain a series of position readings on the continuously moving vapor trail to enable accurate triangulation of the vapor trail and thus provide an indication of the winds at the scanned altitudes.

The foregoing description is intended merely to be illustrative and other embodiments and modifications will be apparent to those skilled in the art without departing from the spirit of the invention. For example, although the photometer described, in which the interference filter has a passband half width of approximately 2 A., provides a highly sensitive device, the sensitivity of the photometer may be increased further by substituting an interference filter having a more narrow passband half width. Narrowing of the passband half width effectively excludes the additional background radiation which occurs naturally in the daytime sky but does not affect the radiation emitted by the vapor trail.

Having thus described my invention, I claim:
1. A photometer for detecting the presence, in the sky, of a vapor trail emitting light within a narrow spectral band, which light is of a different and detectable intensity than that of the same spectral band which occurs naturally in the sky comprising:
optical means adapted to scan a region of the sky and having a relatively narrow field angle to isolate a narrow beam of light from the scanned region and to direct said beam along a primary axis of propagation;
a photocell disposed along said primary axis of propagation so that said light beam may impinge on said photocell;
an interference filter interposed between said photocell and said optical means, the primary passband of said interference filter including the light within said narrow spectral band when the angle of in- cidence of said light beam is normal to said interference filter;

said filter being of a sensitivity such that when said angle of incidence varies from the normal, said passband will shift to a secondary, lower spectral band that does not include the wavelength of light radiated by said vapor trail;

means for switching, repeatedly and at regular intervals, the angle of incidence of said light beam between normal incidence and at an angle to the normal whereby said first and second narrow spectral bands alternatively may pass through said filter and impinge on said photocell;

whereby when said vapor trail is present within the field angle the radiation emitted by the vapor trail and passing normally through the interference filter will create an unbalance in the output signal of the phototube as compared to the signal generated by the deviated beam, said unbalance providing an indication of the presence and intensity of said vapor trail.

2. A photometer as defined in claim 1 further comprising:

means for balancing the light flux of said normal and deviated beams so that when the vapor trail is not present within the field angle, the intensity of the normal and deviated beams will be equal whereby the output signal of said photocell will be in balance when said vapor trail is not present.

3. A photometer as defined in claim 2 wherein said balancing means comprises:

a neutral density optical filter disposed along said primary axis of propagation between said switching means and said interference filter.

4. A photometer as defined in claim 1 further comprising:

means for controlling the primary passband of said interference filter so that said primary passband will include radiation emitted by said vapor trail when said radiation impinges normally on said interference filter.

5. A photometer as defined in claim 4 wherein said means for controlling said primary passband of said interference filter comprises:

a heat conductive support for said filter adapted to transmit heat to said filter;

means for heating said support;

means for continually sensing the temperature of said interference filter; and means responsive to said temperature sensing means for controlling the operation of said heating means to supply a desired quantity of heat to said support.

6. A method for observing the motion of atmospheric winds during daylight conditions comprising:

introducing a relatively narrow vapor trail into a selected atmospheric region, which vapor trail radiates light at a predetermined, selected wavelength and at an intensity that is of a different, detectable intensity from that of the light at said selected wavelength which is radiated naturally by the daytime sky;

scanning said selected atmospheric region with optical means having a relatively narrow field angle to isolate a narrow beam of light from the scanned atmospheric region;

filtering alternatively said isolated beam, first to pass only a narrow, primary spectral band which includes said selected wavelength and then to pass only a narrow, secondary spectral band which does not include said selected wavelength, said primary and secondary spectral bands being in adjacent spectral regions so that they unbalance in the intensity of light occurring naturally in the daytime sky and which is contained within said primary and secondary spectral bands will be relatively small as compared to the unbalance in the intensity of light within said primary and secondary spectral bands when said vapor trail is present within said field angle, said greater unbalance of light intensity providing an indication of the presence of said vapor trail within said field angle; and measuring the azimuth and elevation angle of said optical means when said vapor trail is present within said field angle and at selected time intervals to obtain a series of position readings of said vapor trail.

7. The method as defined in claim 6 further comprising:

balancing the intensity of the light beams so that the light contained within said primary and secondary spectral bands and which is radiated naturally by the daytime sky will be of equal energy levels.

8. The method as defined in claim 6 wherein said filtering is effected by an interference filter and wherein said alternate filtering of said beam comprises:

shifting the passband half width of said interference filter so that said half width first includes only said primary spectral band and then includes only said secondary spectral band.

9. The method as defined in claim 8 wherein said step of shifting said passband half width comprises:

directing said light beam toward said interference filter from a primary direction in which said filter will pass radiation within said primary spectral band and then from a second direction, deviated from said primary direction at which said interference filter will pass only said secondary spectral band.

10. The method as defined in claim 9 further comprising:

balancing the intensity of light directed toward said interference filter from said primary and deviated directions so that when said vapor trail is not present within said field angle the energy levels of said primary and deviated beams will be in balance.

11. In the daytime measurement of upper atmospheric winds, the method which comprises steps of:

introducing a vapor trail into the upper atmosphere, said vapor trail being radiant of energy at a preselected wavelength;

detecting optically said energy radiated by said vapor trail at said preselected wavelength;

simultaneously optically detecting energy radiated naturally from the daytime sky at said preselected wavelength;

comparing the magnitude of said energy radiated from said vapor trail with that of said energy radiated naturally from the daytime sky; and continuing substantially simultaneous optical detection of the energy levels emanating from said vapor trail and from the sky during a selected time interval thereby to continually detect changes in the position of said vapor trail during a selected time interval whereby the movement of said vapor trail may be tracked to provide an indication of the wind velocity at the altitude of said vapor trail.

12. In the daytime measurement of winds in the earth's upper atmosphere, the method which comprises the steps of:

creating a vapor trail, radiant of energy at a predetermined wavelength which lies within a first predetermined narrow spectral band;

optically detecting said energy radiated within said first spectral band and which includes said preselected wavelength radiated by said vapor trail;

optically detecting energy that is radiated naturally from the daytime sky and which is within a second narrow spectral band which is close to said first spectral band and which does not include radiation at said preselected wavelength, the proximity of said first and second spectral bands being such that the difference in their energy levels is relatively small as compared to the difference in energy levels between the radiation of said preselected wavelength that is emitted by the vapor trail and which occurs naturally in the daytime sky;

comparing the magnitude of energy radiated within said first and second spectral bands so that an increase in said difference of said energy levels provides an indication that said vapor trail has been detected; and continuing said steps of detecting and comparing the magnitude of said energy levels during a selected time interval thereby to detect changes in position of said vapor trail and to provide an indication of the wind velocity at the altitude of said vapor trail.

13. A method as defined in claim 12 further comprising:

balancing the energy level of radiation within said first and second spectral bands when said vapor trail is undetected.

References Cited

UNITED STATES PATENTS

| | | | |
|---|---|---|---|
| 2,808,755 | 10/1957 | Millen | 356—205 X |
| 3,448,613 | 6/1969 | Kastner et al. | 73—170 |

JERRY W. MYRACLE, Primary Examiner

U.S. Cl. X.R.

356—205